Figure 1:
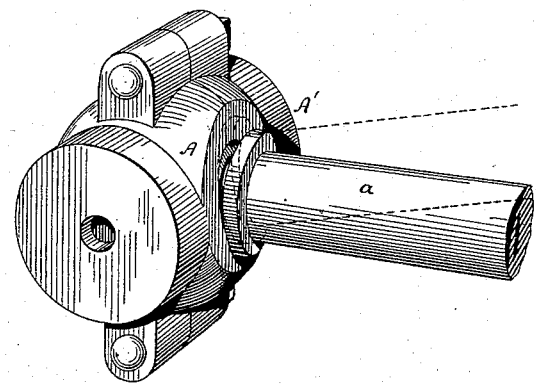
Figure 2:
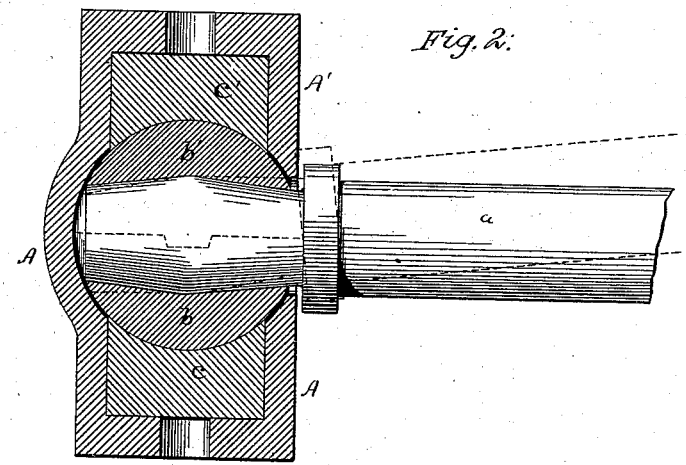

J. F. SMITH.
Pitman-Joint.

No. 217,493.  Patented July 15, 1879.

WITNESSES:
Chas. H. Poole.
Geo. W. Dyer.

INVENTOR:
John F. Smith
By his atty. J. D. Sharon.

UNITED STATES PATENT OFFICE.

JOHN F. SMITH, OF LONDON, OHIO.

IMPROVEMENT IN PITMAN-JOINTS.

Specification forming part of Letters Patent No. 217,493, dated July 15, 1879; application filed February 28, 1878.

*To all whom it may concern:*

Be it known that I, JOHN F. SMITH, of the town of London, county of Madison, and State of Ohio, have invented a new and useful Improvement in Pitman-Joints, which improvement is fully set forth in the following specification and accompanying drawings.

The object of my invention is to furnish a device by which to take up the slack or wear of the ball in the socket of a pitman-joint, so that the ball will move in the socket without any play, and continually be held firmly in the center of the socket, securing uniform friction and wear of the joint, the arm also moving freely in the ball of the socket; and the ball being made in sections saves wear.

In the drawings, No. I is a perspective view, also showing flexible motion of arm of the joint. No. II is a cross-section, showing ball in sections and packing at each end of casing.

Referring to drawings, the arm $a$ being attached to ball $b$ of the socket A flexibly, it divides the motion of the ball, presents greater surface for friction to act upon, and necessarily saves wear, the ball being in sections $b$ and $b'$, for the secure insertion of the arm, and for affording greater facility of motion.

The packing $c$ and $c'$, inserted in each end of the socket-casing A and A', is so adjusted and operated by set-screws or springs, or both conjointly, as to be closed up firmly against the ball $b$, thus taking up all wear or play, the surface of the inner ends of the packing $c$ and $c'$ being enlarged, so as to close in with equal pressure on a large part of the surface of the ball $b$, the pressure being equal from every direction. The ball is thus held constantly in the center of the socket in this manner, preventing friction from unequal side pressure, and giving free play to the arm.

The ball of the joint may be made as a whole by the insertion of a groove or grooves in arm $a$ and a corresponding shoulder or shoulders in ball $b$.

Having thus described my invention, what I claim as new, and desire to secure by Letters Patent, is—

1. The arm $a$ and ball of the joint in sections $b$ and $b'$, substantially as shown and described.

2. In combination, the arm $a$, sections $b$ and $b'$ of ball of the joint, and packing $c$ and $c'$ in each end of casing A and A', substantially as shown and described.

JOHN F. SMITH.

Witnesses:
   A. P. LINN COCHRAN,
   H. HULLENBECK.